United States Patent [19]
Fidei et al.

[11] 3,908,140
[45] Sept. 23, 1975

[54] LIQUID-COOLED ROTOR FOR DYNAMOELECTRIC MACHINES

[75] Inventors: Frank P. Fidei, Pittsburgh; Sui-chun Ying, Monroeville; Warren W. Jones, Bullskin, all of Pa.

[73] Assignee: Westinghouse Electric Corporation, Pittsburgh, Pa.

[22] Filed: June 14, 1974

[21] Appl. No.: 479,386

[52] U.S. Cl. .................... 310/54; 310/61; 310/64
[51] Int. Cl.² ........................................ H02K 9/00
[58] Field of Search ............ 310/52, 53, 54, 55, 56, 310/57, 58, 59, 270, 60, 61, 64, 65

[56] References Cited
UNITED STATES PATENTS

| | | | |
|---|---|---|---|
| 2,786,951 | 3/1957 | Morgan | 310/64 |
| 3,005,119 | 10/1961 | Schmitt | 310/64 |
| 3,034,003 | 5/1962 | Beidner | 310/64 |
| 3,075,104 | 1/1963 | Willyoung | 310/64 |
| 3,131,321 | 4/1964 | Gibbs | 310/64 |
| 3,320,447 | 5/1967 | Banchieri | 310/61 |
| 3,322,985 | 5/1967 | Azbukin | 310/61 |
| 3,733,502 | 5/1973 | Curtis | 310/61 |
| 3,749,952 | 7/1973 | Lambrecht | 310/64 |

*Primary Examiner*—R. Skudy
*Attorney, Agent, or Firm*—G. M. Medwick

[57] ABSTRACT

A liquid-cooled rotor is provided for large dynamoelectric machines such as turbine generators. Coolant liquid, preferably water, is supplied through a shaft bore and radial passages to a distribution chamber from which it flows to the rotor winding conductors through tubes placed in slots in the surface of the shaft. The water tubes extend under the end turn portions of the rotor winding coils substantially longitudinally to the body portion of the rotor and then radially outward into the spaces between the longitudinal coil sides. The tubes extend back longitudinally through these spaces to the ends of the coils and are connected to the individual turns of the winding near the centers of the circumferential portions of the coils.

7 Claims, 8 Drawing Figures

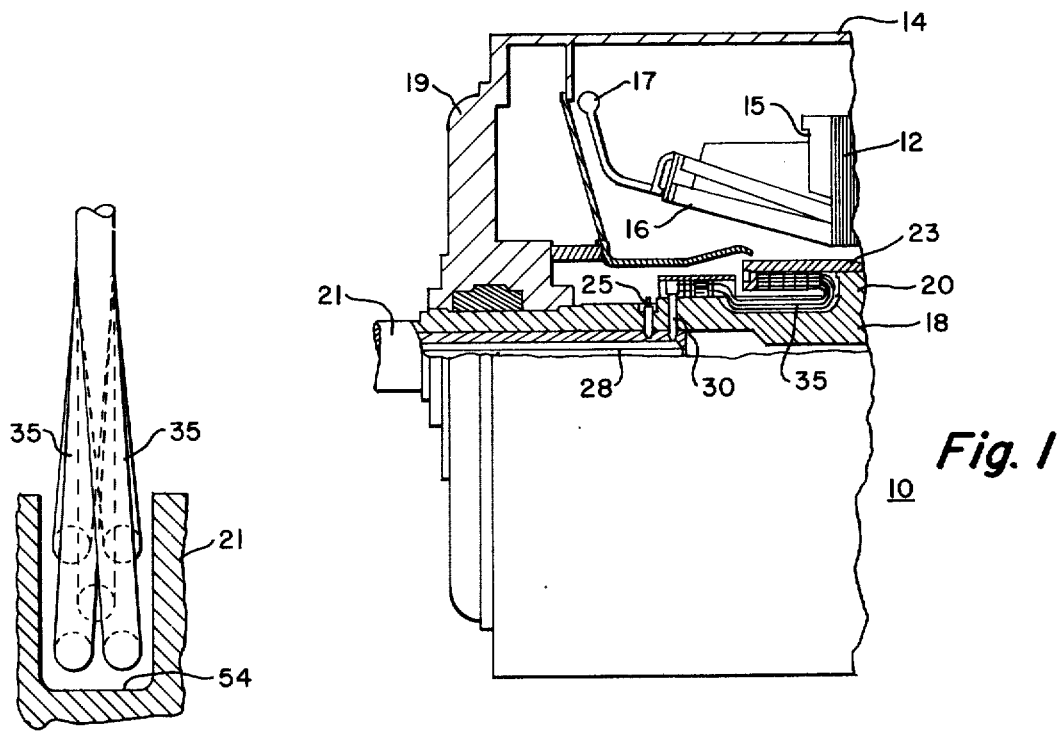
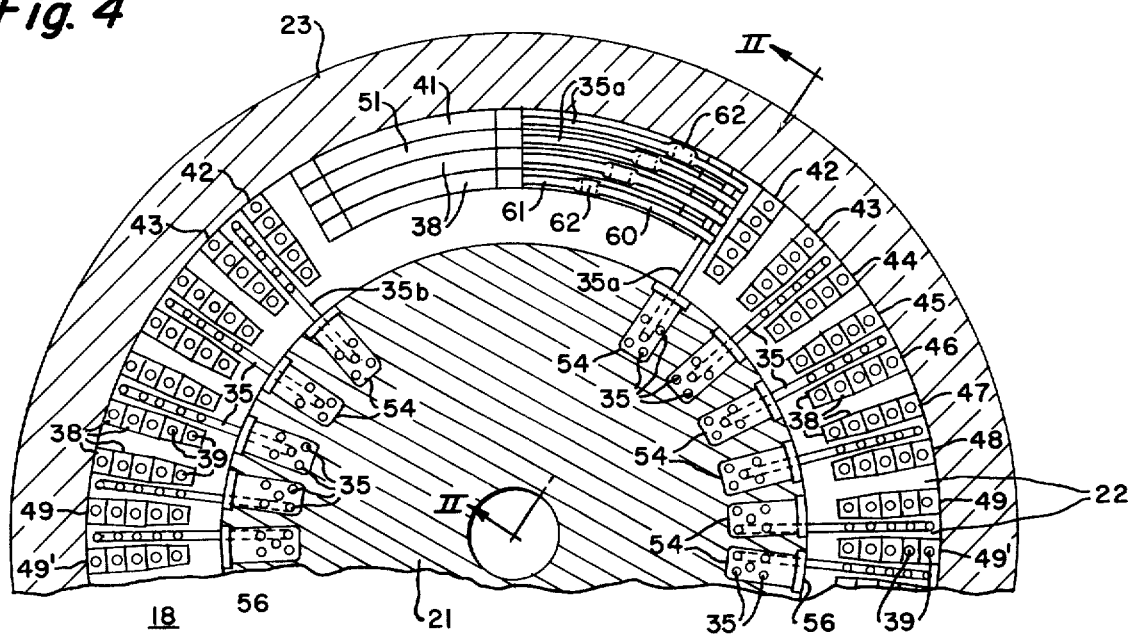

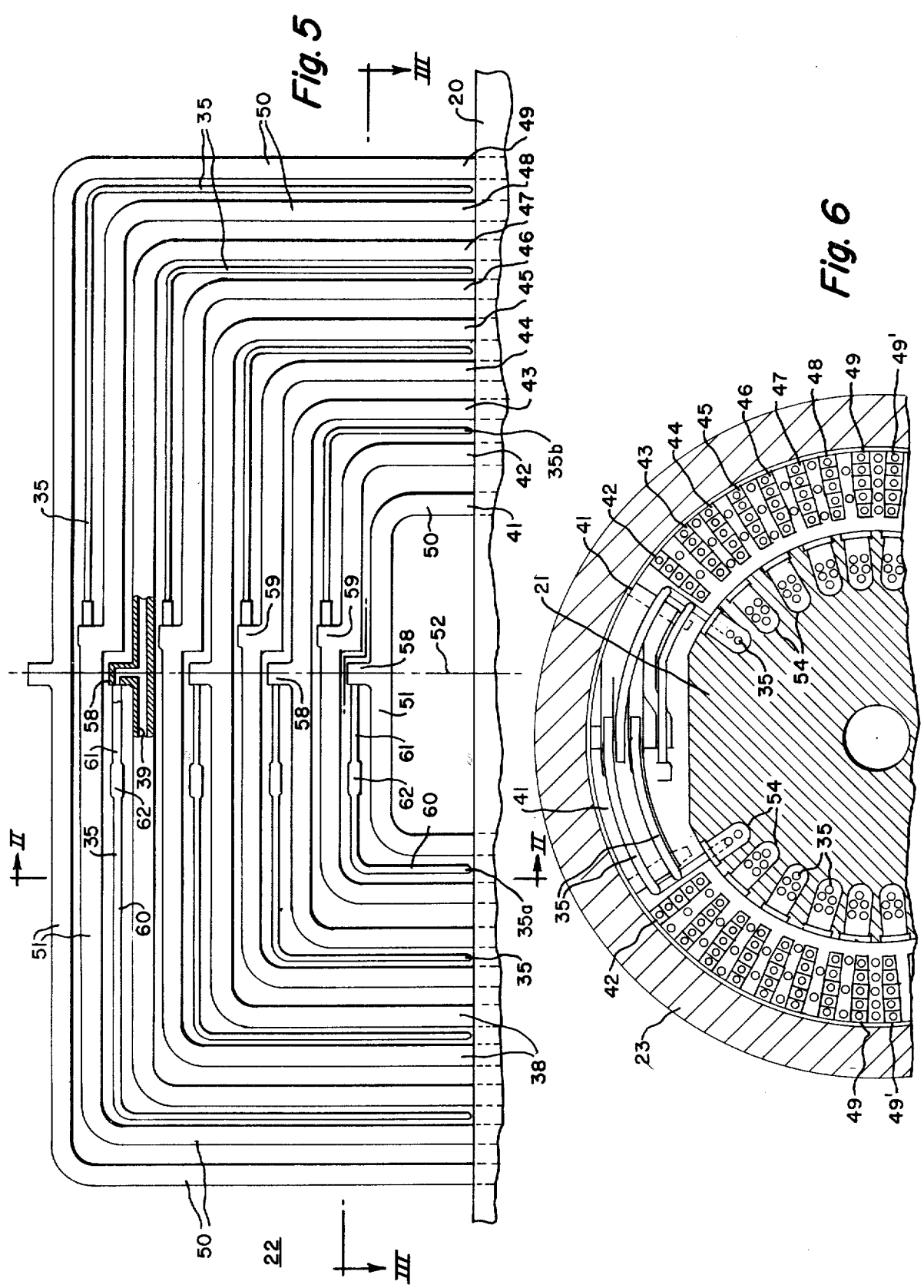

LIQUID-COOLED ROTOR FOR DYNAMOELECTRIC MACHINES

BACKGROUND OF THE INVENTION

The present invention relates to the cooling of dynamoelectric machines such as large turbine generators, and more particularly to the supply of coolant liquid to the windings of liquid-cooled rotors for such machines.

Large turbine generators are usually of the inner cooled, or direct cooled, construction in which a coolant fluid is circulated through duct means in the stator and rotor slots in direct thermal relation with the current-carrying conductors inside the gound insulation. This type of construction provides a very effective cooling system which has made it possible to attain very high ratings for large generators. The coolant fluid used in these machines heretofore has usually been hydrogen which fills the gas-tight housing and is circulated through the ducts of the stator and rotor windings and through radial or axial ducts in the stator core. As further increases in the maximum capacities of these large generators have become necessary, further improvements in cooling have been required and have been obtained by the use of more efficient coolant fluids such as liquids. A very considerable improvement in cooling has been obtained in this way by circulating a liquid coolant such as water through the ducts of the stator winding, and a substantial further improvement can be obtained by similarly circulating a coolant liquid through passages in the rotor winding.

Coolant liquid such as water is preferably supplied to the rotor of a large generator, and discharged therefrom, through the shaft bore so that the sealing problem can be minimized by introducing and discharging the liquid at locations of minimum radius where the centrifugal force on the liquid is at a minimum. When the liquid is thus introduced through the shaft, it flows from the bore through radial passages to an annular distribution chamber on the surface of the rotor from which it can be distributed to the conductors of the rotor winding through suitable tubes or hydraulic connectors. After flowing through the rotor conductors, the heated coolant may flow through similar tubes and passages at the opposite end of th rotor and be discharged through a central bore at that end or it may return to the same end at which it entered to be discharged. Arrangements of this general type are shown, for example, in patents to Curtis et al. U.S. Pat. No. 3,733,502 and Gibbs et al. U.S. Pat. No. 3,131,321, and a copending application of F. P. Fidei et al. Ser. No. 444,582, filed Feb. 21, 1974, and assigned to the Assignee of the present invention.

In this type of construction, the tubes through which the coolant flows to the winding are preferably placed in slots in the rotor shaft and connected to the winding conductors in the end turn portions of the winding. The arrangement of the tubes must be such that they provide sufficient flexibility to allow for thermal expansion and contraction of the winding conductors without damaging or excessively stressing the tubes, and must also be such that the tubes can be adequately supported against the high rotational forces which occur during normal operation at relatively high speed. It is also necessary that the arrangement of the tubes and winding conductors result in a relatively compact structure to meet the space limitations. The tubes must pass through the end turn region under the retaining ring to reach the winding conductors to which they are connected but should not require any additional space in this region. The reason for this is that the retaining rings are very highly stressed during operation and the maximum length and diamter which can be obtained for retaining rings are strictly limited by the strength limitations of available materials. It is necessary, therefore, to dispose the winding conductors and coolant tubes to fit within this limited space. A still further requirement is that the manufacture and installation of the coolant tubes must not be unreasonably difficult or expensive, and that repair and replacement of the tubes, if necessary, or of individual winding coils or turns be made as simple as possible. It will be evident that meeting all of these requirements in a practical structure presents a very difficult problem.

SUMMARY OF THE INVENTION

The present invention provides a rotor construction for large liquid-cooled turbine generators in which coolant liquid such as water is supplied to the rotor winding in a manner which meets the difficult requirements discussed above.

In accordance with the invention, coolant liquid is supplied to the rotor, and preferably also discharged, through the shaft bore at the exciter end of the rotor. The liquid flowing in the shaft bore flows to and from an annular distribution chamber on the surface of the rotor through suitable radial passages. The liquid is directed to and from the winding conductors by means of coolant tubes connected to the distribution chamber by insulating connectors and disposed in longitudinal slots in the shaft surface in which the tubes can be adequately supported by wedges. The tubes extend through these shaft slots to the ends of the slots adjacent the body portion of the rotor, passing under the end turn portions of the rotor winding coils in the end region of the rotor. The tubes then extend generally radially from the shaft slots into the spaces between the longitudinal portions of the winding conductors under the retaining ring aand extend back longitudinally through these spaces to the ends of the respective coils. The tubes then extend circumferentially and are connected to the individual conductors near the centers of their circumferential portions to communicate with the coolant passages in the conductors to supply coolant thereto or to discharge heated coolant therefrom. In this way, a structure is provided in which the coolant tubes have sufficient flexibility to allow for thermal expansion and contraction of the winding conductors and are arranged in a manner which facilitates installation and repair, and which requires no more space under the retaining ring than is necessary in a conventional gas-cooled rotor.

BRIEF DESCRIPTION OF THE DRAWINGS

The invention will be more fully understood from the following detailed description, taken in connection with the accompanying drawings, in which:

FIG. 1 is a view, partly in longitudinal section and partly in elevation, of a turbine generator embodying the invention;

FIG. 3 is a transverse sectional view of the rotor substantially on the line III—III of FIGS. 2 and 5;

FIG. 4 is a fragmentary view showing the ends of the coolant tubes, taken substantially on the line IV—IV of FIG. 2;

FIG. 5 is a developed plan view of one end of the rotor winding showing the end portions of the coils and the arrangement of the coolant tubes;

FIG. 6 is a transverse sectional view similar to FIG. 3 showing a different arrangement of the coolant tubes;

DESCRIPTION OF THE PREFERRED EMBODIMENT

Figure 2:
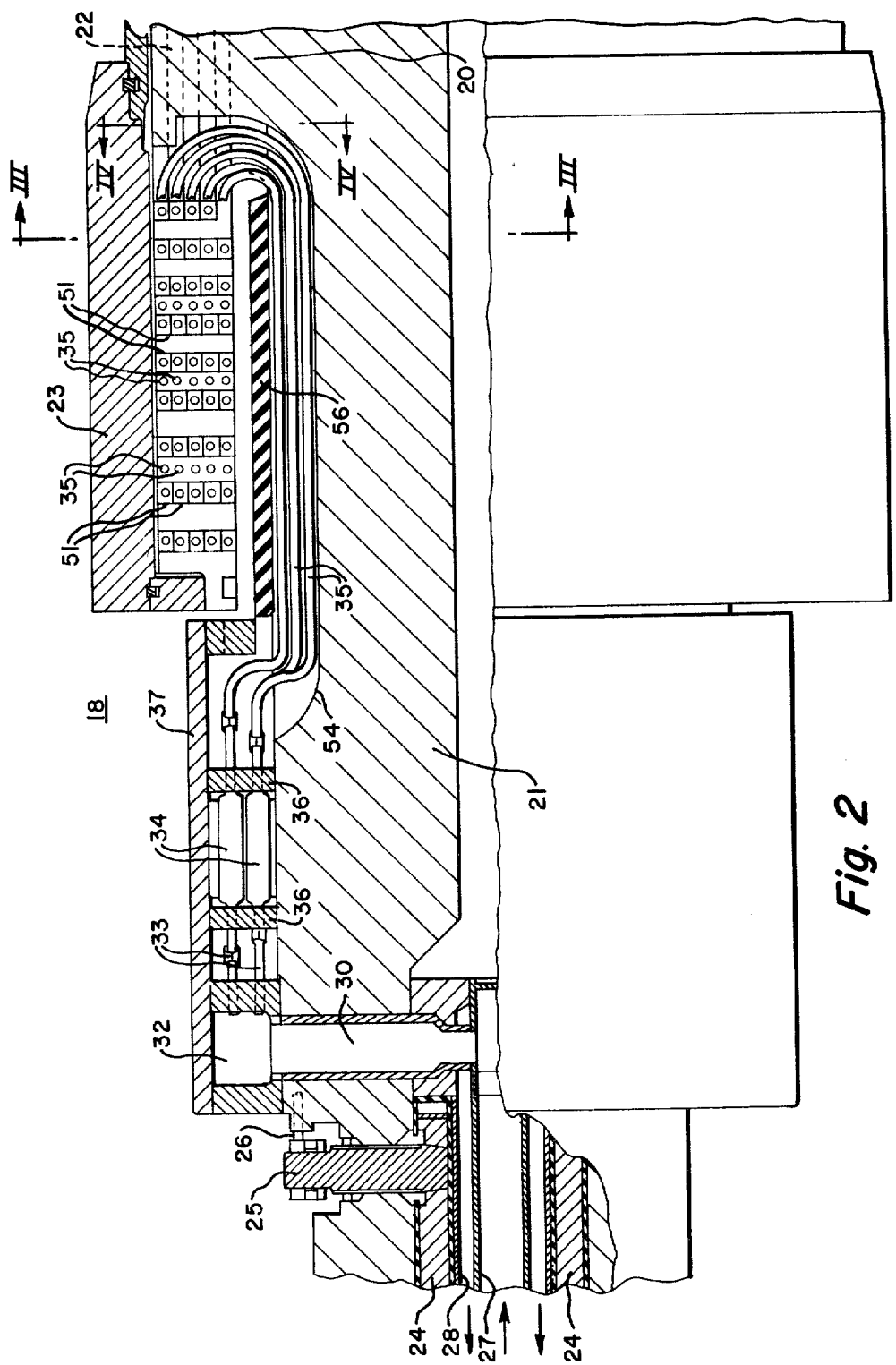
FIG. 2 is a longitudinal view on a larger scale showing one end of the rotor, partly in section on the line II—II of FIGS. 3 and 5.

The invention is shown in the drawing embodied in a liquid-cooled rotor for use in a large turbine generator of typical construction, although it should be understood that the invention may be applied to any desired type of dynamoelectric machine.

Referring first to FIG. 1, there is shown a large generator 10 which has a stator core 12 supported in a substantially gas-tight outer housing 14. The core 12 is of the usual laminated construction having a generally cylindrical bore therethrough, and the laminations are clamped between suitable end plates 15 in the usual manner. The stator core 12 has longitudinal slots in its inner periphery for the reception of a stator winding 16 which may be of any suitable or usual type. The winding 16 is shown as being a liquid-cooled winding and circular inlet and discharge manifolds 17 are provided at opposite ends of the machine for circulating a coolant liquid such as water through the coils of the stator winding. The housing 14 is filled with coolant gas, preferably hydrogen, which is circulated through the interior of the housing in the usual manner and suitable baffling of any desired type may be provided in the housing to direct the flow of gas therein. The machine has a rotor 18 which is disposed in the bore of the stator core 12 and supported in end brackets 19 at each end of the housing 14 in bearing assemblies of any desired type which may include gland seals to prevent leakage of gas from the housing.

As shown more clearly in FIG. 2, the rotor 18 has a body portion 20 and shaft portions 21 which are preferably integral with the body portion and extend axially from each end thereof. The body portion 20 is provided with peripheral slots in the usual manner for reception of a rotor winding 22. The rotor winding 22, which constitutes the field winding of the generator 10, preferably comprises the usual concentric, multi-turn coils disposed in two or four pole groups, as more fully described below. The coils extend beyond the ends of the body portion 20 and the end turn portions of the coils are supported against rotational forces by the usual heavy retaining rings 23. Excitation circuit for the winding 22 is supplied from a suitable exciter or other direct current source through axial conductors 24 disposed in a central bore of the rotor shaft 21. Radial leads 25 extend through the shaft 21 and are threaded into the conductors 24. The radial leads 25 are connected to the winding 22 by means of suitable axial leads 26 of any desired type.

As previously indicated, the rotor winding 22 is cooled by circulation of a coolant liquid therethrough. For this purpose the liquid, preferably water, is supplied through the bore of the shaft 21, and preferably is both introduced and discharged at the time end of the machine. As shown in the drawing, two concentric stainless steel tubes 27 and 28 are disposed in the bore of the shaft 21 on the axis thereof, the tube 27 forming a central passage for entrance of water and the tubes 27 and 28 forming an annular passage between them for discharge of water. Coolant water may be supplied to the tubes 27 and 28 and discharged therefrom in any desired manner such as that shown, for example, in the above-mentioned copending application.

The coolant water entering through the tube 27 flows through radial passages 30 in the shaft 21 to an annular distribution chamber 32 extending around the shaft on the surface thereof. The passages 30 are preferably lined with stainless steel liners and the chamber 32 is also made of stainless steel, although any suitable corrosion-resistant material could be used. Water connections 33 are provided in the wall of the chamber 32 on the side toward the rotor body. The connections 33 are distributed, preferably in pairs, as shown, around the circumference of the chamber 32 and are attached to insulating connectors 34 which, in turn, are connected to stainless steel tubes 35 which convey the water to the rotor winding. The water connections 33 and insulating connectors 34 are supported between flanges 36 on the rotor surface, with suitable blocking means, and are retained in position by a ring 37 shrunk or otherwise secured on the rotor to support the hydraulic connections against centrifugal forces. Water flowing through the tubes 35 to the winding 22, may, if desired, flow through the winding conductors to the opposite end of the rotor and be discharged through a distribution chamber, radial passages and shaft bore similar to those illustrated in FIG. 2. In the preferred embodiment, however, the liquid returns through the winding to the same end of the rotor and is discharged through others of the tubes 35 to the annular chamber 32. In this arrangement, the chamber 32 is divided by internal partitions into entrance and discharge portions, as shown in the above-mentioned copending application, and the discharged coolant flows through radial passages similar to the passages 30 to the annular discharge channel between the tubes 27 and 28 for discharge from the machine.

As shown in FIGS. 3 and 5, the rotor winding 22 is composed of a plurality of concentric, generally rectangular, multi-turn coils. As shown, the winding is a two-pole winding in which the coils are arranged in the usual manner in two pole groups connected to be of opposite polarity. It will be understood, of course, that the winding may equally well be arranged in four pole groups of alternating polarity to provide a four-pole rotor. The winding is made up of conductors 38 which are preferably of rectangular cross section with central passages 39 extending through them for passage of the coolant water. It will be understood that any suitable type of conductor could be used with water passages or ducts provided in any desired manner so as to be in good heat exchange relation with the conductors. In the illustrated embodiment, each pole group consists of nine coils designated 41 to 49, inclusive, and arranged concentrically as shown in FIG. 5. The coil 41 is shown as having its conductors 38 arranged and connected in a four-turn coil while the remaining coils are five-turn coils. In each coil, the conductors 38 are arranged to form longitudinal portions or coil sides 50 disposed in the slots of the rotor body 20 and extending longitudinally beyond the end of the rotor body into the endturn region. The ends of the longitudinal portions 50 of the coil conductors are joined by circumferential or end turn portions 51 extending circumferentially of the rotor between the corresponding coil sides, as shown in FIG. 5, to form generally rectangular coils. The coils are arranged concentrically as shown with the longitudinal portions 50 of adjacent coils lying in adjacent slots of the rotor body so that the longitudinal coil sides are spaced apart in the end region beyond the end of the rotor body. The coil sides of successive coils thus lie at progressively greater distances from a common longitudinal center line 52 which is at the center of the magnetic pole formed by the pole group.

Cooling water is supplied to the individual conductors 38 by means of the coolant tubes 35. These tubes are connected to the insulating connectors 34 and are arranged in groups and placed in longitudinal slots 54 in the shaft 21 of the rotor. The slots are arranged to correspond in position with the spaces between the coil sides 50 and in the embodiment shown in FIG. 3, the first slot 54 at one side of each pole group contains four tubes 35 while the remaining slots each contain five tubes. The slots 54 extend axially under the end turn portions 51 of the coils and terminate adjacent the end of the body portion 20 of the rotor. The tubes 35 extend through the length of the slots 54 and are retained in position therein by wedges 56 and if desired or necessary by additional supporting or blocking means within the slots themselves. At the end of each slot 54, the tubes 35 in the slot are brought radially outward and extend into the space between adjacent longitudinal coil sides 50.

In the embodiment of the invention shown in FIGS. 3 and 5, there are half as many slots 54 as there are coil sides 50 and the slots are placed generally in radial alignment with alternate spaces between the coil sides. The tubes 35 extend radially outward from the slots and each group of tubes is brought into vertically-spaced relation, in the manner shown in FIG. 4, with the tubes in positions generally corresponding to the conductors to which they are to be connected, as can be seen in FIG. 3. Each group of tubes 35 thus extends outward into a space between adjacent longitudinal coil sides 50. The tubes then extend back longitudinally in this space and circumferentially in the corresponding space between the circumferential portions 51 of the coils for connection to the appropriate conductor adjacent the center of the coil. As seen in FIGS. 3 and 5, the groups of tubes 35 on each side extend into alternate spaces between coils so that the tubes lie on opposite sides of successive coils. Thus, the group of four tubes 35a from the first slot 54 on the right of the pole center in FIG. 3 extends into the longitudinal space between coils 41 and 42. The tubes 35b from the first slot 54 on the left extend into the space between coils 42 and 43. The tubes from the next slot on the right extend into the space between coils 43 and 44. The remaining groups of tubes continue to alternate in this manner on opposite sides of successive coils to the end of the pole group. The tubes in the fifth slot on each side extend up into the space between the last coil 49 and the adjacent side of the last coil 49' of the other pole group. The coolant tubes associated with the second pole group have not been shown but are arranged in the same manner as those of the first pole group shown in FIGS. 3 and 5.

The tubes 35 of each group of tubes extend circumferentially to a point near the pole center line 52 and are there connected to the adjacent circumferential conductors 51, the tubes connected to successive coils coming alternately from opposite sides as described above. Each circumferential conductor 51 is provided with a lug 58 except that the conductor in each coil which crosses over to the next coil has an offset portion 59. The tubes 35 are secured in the lugs 58 and offsets 59, as shown in FIG. 5, to communicate with the internal water passages 39 to supply coolant water to the conductors. The tubes 35 are preferably made with a main portion 60 which extends through the slot 54 and longitudinally and circumferentially in the space between adjacent coils. The terminal portion 61 of the tube is separate from the main portion 60 and is connected thereto by a brazed or other water-tight coupling or joint 62. The terminal portion 61 is brazed or otherwise secured to the conductor. In the embodiment of FIG. 3, the joints 62 of the tubes for the several turns or conductors of each coil are staggered, or placed at different distances from the center line, so that the joints are individually accessible from the top of the coil, although other arrangements could be used.

With the water tubes 35 arranged and connected in the manner described, the requirements previously discussed are fully met. The position and arrangement of the tubes inherently gives them sufficient flexibility to follow the thermal expansion and contraction of the coils without being overstressed or otherwise damaged. The tubes extend under the end turn portions of the coils in the shaft slots 54, and extend back in the longitudinal spaces between coil sides to the ends of the coils to which they are to be connected. Thus, no additional radial space is required under the retaining ring beyond that required for the winding itself, and the necessary size of the retaining ring is not increased over that required for a conventional gas-cooled rotor. In the arrangement shown, as seen particularly in FIG. 5, the water tubes of successive coils come in from opposite sides so that adequate room is available between the coils for the insertion of brazing tools, or other necessary tools, so that the tubes can easily be installed, and if repairs become necessary the terminal portion of the tube can easily be disconnected so that a particular tube of group of tubes can be replaced, or one coil of the winding can be removed if necessary for replacement or repair. In the arrangement of FIG. 3, with the joints 61 of the tubes staggered, individual turns of the winding are readily accessible and can be removed if necessary for repair.

Figure 7:
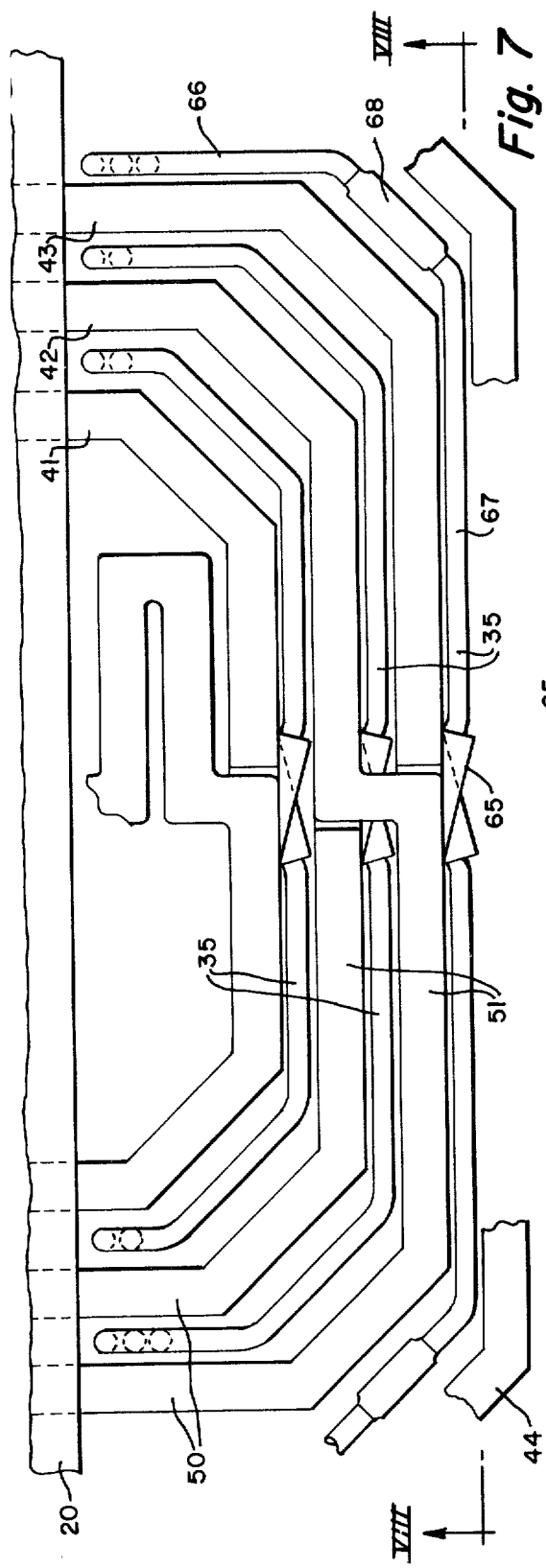
FIG. 7 is a developed plan view showing one end of several coils of a winding with the coolant tubes arranged as in FIG. 6.
Figure 8:
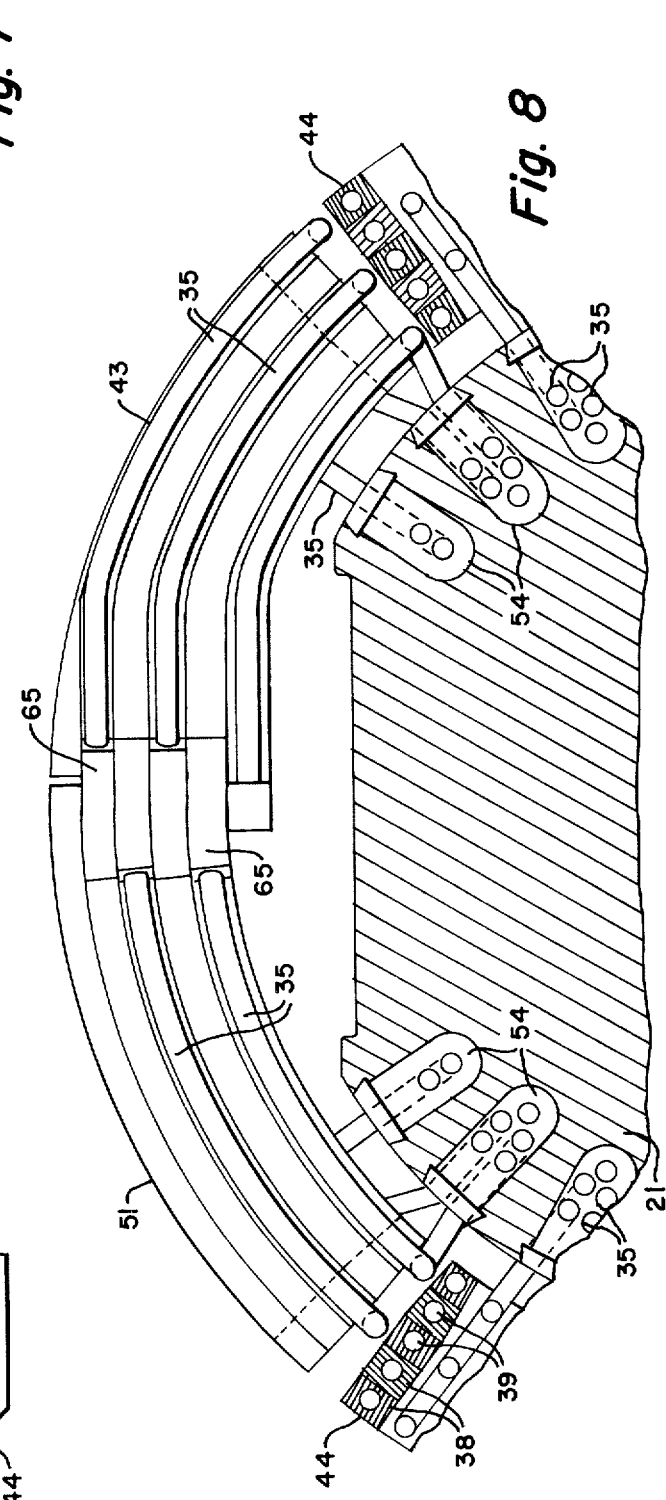
FIG. 8 is a view substantially on the line VIII—VIII of FIG. 7 showing the end portion of one coil of the winding.

An alternative arrangement of the water tubes 35 is shown in FIGS. 6, 7 and 8. In this arrangement, the shaft slots 54 in which the water tubes are disposed are arranged to be generally in radial alignment with alternate coil sides on both sides of the center line as shown in FIG. 6. In this specific embodiment, the first coil 41 has four turns as before, the remaining coils 42 through 49 each having five turns. The first two slots 54 on each side of the center line each contain only two tubes 35, the remaining slots containing five tubes each. The two tubes in each of the first two slots 54 are brought up radially outward on opposite sides of the first coil 41 and connected alternately to the four turns of that coil as can be seen in FIG. 6. The five tubes in each of the remaining slots 54 are brought up radially outward of the slot in the manner shown, three tubes being positioned on one side of the adjacent coil side 50 and two tubes on the other side. This results in the arrangement illustrated in FIGS. 6, 7 and 8 in which each coil except the first has three tubes in the longitudinal space on one side and two tubes on the other side. The tubes extend longitudinally in these spaces in the manner described above and circumferentially at the ends of the coils for connection to the circumferential conductors 51 at the center thereof. In each case, as shown in FIG. 8, the water tubes 35 come in across the circumferential end portion of the coil from opposite sides and are connected alternately to the successive turns of the coil. In this embodiment, as shown particularly in FIG. 7, the conductors 38 have angularly-arranged lugs 65 to which the tubes 35 are connected. The lugs 65 are arranged so that the water entering the passage 39 is flowing almost in the direction of the conductor itself so that there is a relatively gentle transition and little or no erosion of the copper conductor by the water.

FIG. 7 illustrates a further modification which is applicable to both arrangements of water tubes. In this embodiment, the main portion 66 of each water tube 35 extends only to the end of the longitudinal portion 51 of the coil conductor, and the terminal portion 67 of the water tube extends over the circumferential portion 51 to the center thereof. The joint or connection 68 between the main and terminal portions of the water tube is then disposed as shown in FIG. 7 adjacent the junction between the longitudinal and circumferential portions of the conductor, that is, the joints are made at the corners of the rectangular coils. In some instances this may provide better accessibility than the arrangements shown in FIGS. 3 and 5.

It will be seen that the arrangements of FIGS. 6–8 has the same advantages as the previous embodiment of accessibility, flexibility of the water tubes, and minimum space requirements. In either embodiment of the invention, the heated coolant water after flowing through the conductors may be discharged at either end of the rotor as previously explained. In the preferred embodiment shown, however, the coolant water returns to the same end at which it entered to be discharged, the distribution chamber 32 being divided by internal partitions for this purpose as previously described. With this arrangement it is, of course, necessary that all of the water tubes 35 on one side of the pole center line be connected to the entering coolant water, and all the tubes on the opposite side of the center line be connected to the discharging water, the conductors being suitably connected at the opposite end of the rotor to provide for this type of flow. This results in the further advantage, in the FIG. 6 embodiment, that countercurrent flow occurs in the successive turns or conductors throughout each coil.

It should now be apparent that an arrangement has been provided for connecting water tubes to the conductors of a water-cooled rotor in a manner which meets all the requirements and which can be produced in a relatively simple and inexpensive manner. Certain specific embodiments have been shown and described for the purpose of illustration but it will be apparent that the invention is not limited to those specific arrangements but includes all equivalent embodiments and modifications.

What is claimed is:

1. A rotor member for a dynamoelectric machine comprising:
   a body portion and shaft portions connected thereto,
   a winding comprising a plurality of concentrically-disposed multi-turn coils, each coil having a plurality of conductors having longitudinal portions lying in slots in said body portion and extending beyond the body portion and circumferential portions joining the ends of said longitudinal portions, said longitudinal portions being spaced apart circumferentially and defining longitudinal spaces therebetween and said circumferential portions being spaced apart longitudinally and defining circumferential spaces therebetween,
   said conductors having passages for flow of coolant liquid,
   a plurality of slots in said shaft portion extending longitudinally and terminating adjacent said body portion,
   a plurality of coolant tubes disposed in said shaft slots and extending under said circumferential portions of said coil, said coolant tubes extending in said slots substantially to the ends thereof,
   said coolant tubes extending generally radially from said shaft slots adjacent the end of said rotor body portion into said longitudinal spaces between said longitudinal portions of said conductors,
   said coolant tubes then extending longitudinally through said longitudinal spaces between said longitudinal portions of said conductors and circumferentially in said circumferential spaces between said circumferential portions of said conductors,
   said coolant tubes being connected to said circumferential portions of at least some of said conductors adjacent the centers thereof to communicate with said passages therein,
   said coolant tubes extending through each of said longitudinal and circumferential spaces being in vertically-spaced relation in positions generally corresponding to the conductors to which they are connected, and,
   means for supplying coolant liquid to said tubes to flow through said tubes and passages.

2. A rotor member as defined in claim 1 in which each of the coolant tubes includes a main portion, a terminal portion connected to the conductor, and joint means connecting the main and terminal portions of the tube.

3. A rotor member as defined in claim 2 in which said main portion of each coolant tube extends longitudinally, the terminal portion of each tube extends circumferentially, and the joint means are positioned adjacent the junctions between the longitudinal and circumferential portions of the conductors.

4. A rotor member as defined in claim 1 in which said coils are generally rectangular and disposed in at least two pole groups, the longitudinal portions of successive coils of each group lying at progressively greater distances from a common longitudinal center line, the coolant tubes connected to each coil being disposed in a single longitudinal space on one side only of said center line and being connected to the circumferential portions of the conductors adjacent the center thereof.

5. A rotor member as defined in claim 4 in which the coolant tubes connected to successive coils are disposed alternately on opposite sides of the center line.

6. A rotor member as defined in claim 5 in which each coolant tube includes a main portion extending longitudinally and circumferentially, a terminal portion connected to the conductor, and joint means connecting the main and terminal portions of the tube, the joint means of the tubes connected to each coil being disposed at varying distances from the center line.

7. A rotor member as defined in claim 1 in which said coils are generally rectangular and disposed in at least two pole groups, the longitudinal portions of successive coils of each group lying at progressively greater distances from a common longitudinal center line, the coolant tubes connected to adjacent conductors of each coil being disposed alternately in longitudinal spaces on opposite sides of the center line.

* * * * *